(12) United States Patent
Kralik et al.

(10) Patent No.: US 6,899,380 B2
(45) Date of Patent: May 31, 2005

(54) SUNSHADE FOR A MOTOR VEHICLE ROOF

(75) Inventors: Martin Kralik, Weilheim (DE); Robert Braun, Berg (DE); Horst-Martin Schulz, Munich (DE); Thomas Schwarzenbart, Krailling (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 4 days.

(21) Appl. No.: 10/137,704

(22) Filed: May 3, 2002

(65) Prior Publication Data

US 2003/0006630 A1 Jan. 9, 2003

(30) Foreign Application Priority Data

May 9, 2001 (DE) .......................... 101 22 570

(51) Int. Cl.⁷ .................................................. B60J 1/20
(52) U.S. Cl. .............. 296/214; 160/273.1; 160/370.22; 296/216.08
(58) Field of Search ............................ 296/214, 216.06, 296/216.08; 160/265, 272, 273.1, 370.22

(56) References Cited

U.S. PATENT DOCUMENTS

| | | | | |
|---|---|---|---|---|
| 4,175,608 A | * | 11/1979 | Alten | 160/273.1 |
| 4,923,244 A | * | 5/1990 | Clenet | 296/214 |
| 5,372,401 A | * | 12/1994 | Odoi et al. | 296/216.06 |
| 6,161,893 A | | 12/2000 | Ewing et al. | |

FOREIGN PATENT DOCUMENTS

| | | | | |
|---|---|---|---|---|
| DE | 197 39 919 A1 | | 3/1999 | |
| DE | 198 60 826 A1 | | 7/2000 | |
| FR | 1355707 | * | 2/1964 | 160/273.1 |
| JP | 258213 | * | 10/1988 | 296/214 |
| JP | 403067723 | * | 3/1991 | 296/216.08 |
| JP | 2001-55046 | | 2/2001 | |

* cited by examiner

Primary Examiner—Dennis H. Pedder
(74) Attorney, Agent, or Firm—Nixon Peabody LLP; David S. Safran

(57) ABSTRACT

A sunshade for a motor vehicle roof (2) with a shade screen (5) which can be wound onto a winding rod (6) and which is located underneath the roof, the opposing side edges of the shade screen are movably guided in the direction of shade motion on guide rails (7) and are held in the transverse direction with pre-tensioning of the shade screen (5). To produce pretension in the transverse direction without tensioning elements or bars which are permanently attached to the shade screen and which would hinder rewinding, it is provided that the engagement elements, which are guided on the guide rails (7), can be coupled to the side edges of the length (5) of shade when it is unwound to keep the length (5) of shade pre-tensioned in the transverse direction, so that the sunshade (4) located under an arched vehicle roof (2) can follow the arch of the roof, but can be disengaged for the shade screen (5) as it is wound onto the winding rod so as to enable the shade screen to be wound more compactly.

25 Claims, 9 Drawing Sheets

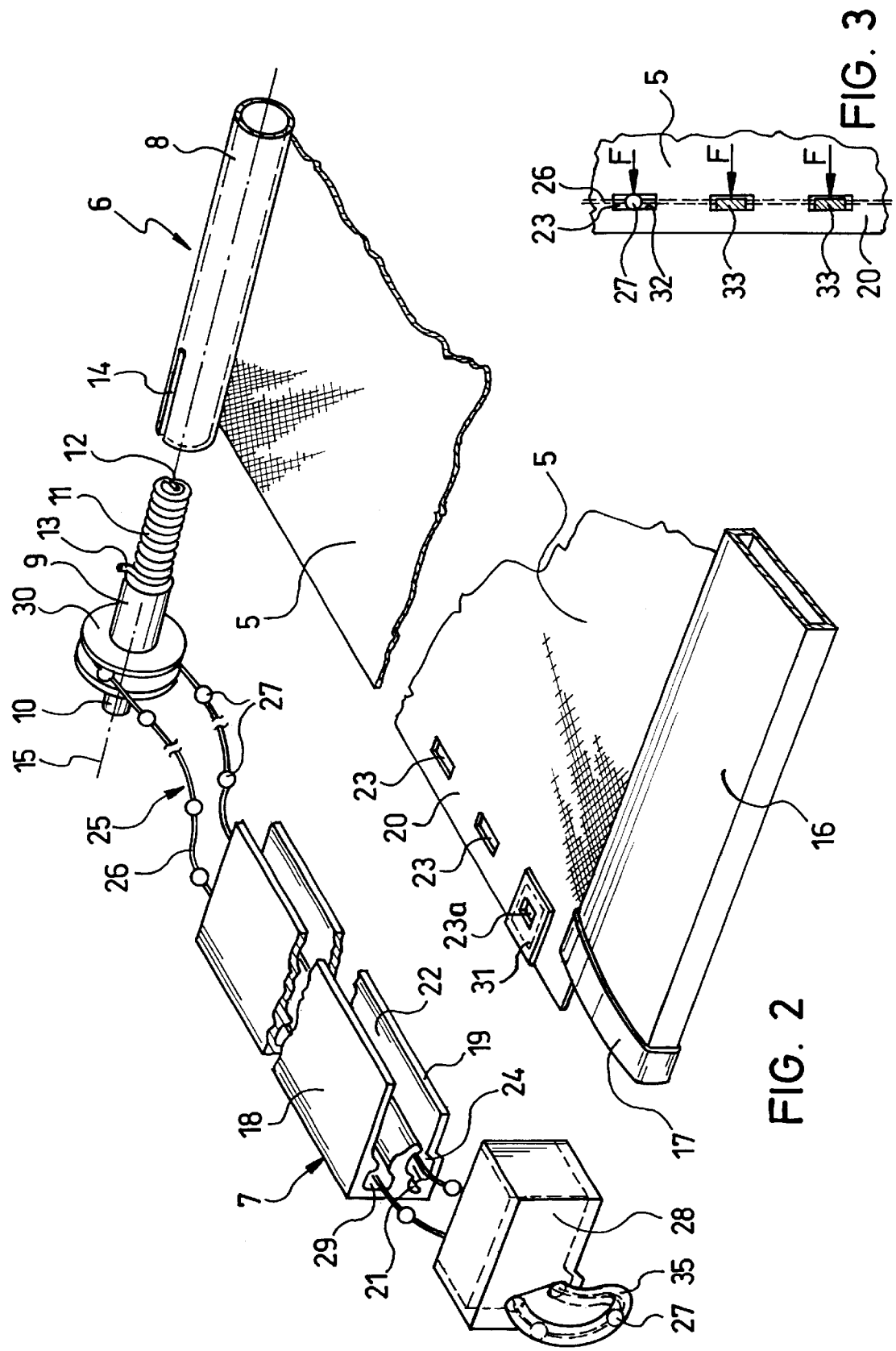

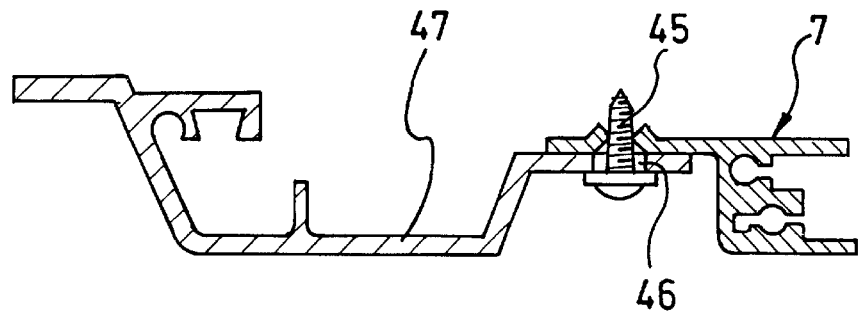
FIG. 13
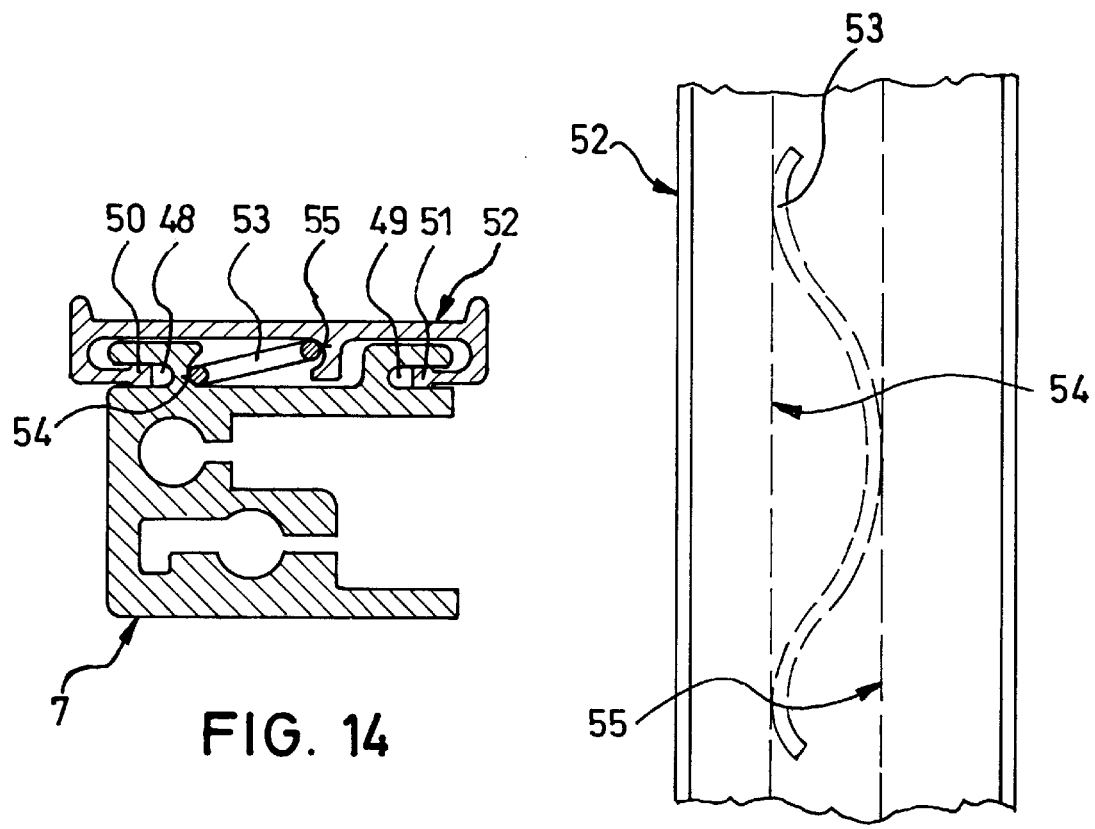
FIG. 14
FIG. 15

SUNSHADE FOR A MOTOR VEHICLE ROOF

BACKGROUND OF THE INVENTION

1. Field of the Invention

The invention relates to a sunshade for a motor vehicle roof with a shade screen which can be wound onto a winding rod and which is located underneath the roof; the opposing side edges of the shade being movably guided in the direction of shade motion on guide rails and being held in the transverse direction with pre-tensioning of the shade.

2. Description of the Related Art

Published German Patent Application DE 197 39 919 A1 discloses one such sunshade in which edge stiffening is formed on the side edges of the shade, for example, in the form of a U-shaped, injected-on plastic edge which is movably held in a bent guide area of the guide rail and due to its stiffness and greater thickness in the transverse direction cannot slide out of the guide rail. When the shade screen is wound onto the winding shaft, however, the thickened edge is disadvantageous, since a nonuniform winding diameter is formed over the length of the winding shaft.

U.S. Pat. No. 6,161,893 discloses a sunshade for motor vehicle roofs which has a shade with several bars which are guided in lateral guide rails. When the shade is unwound from the winding shaft, the bars are arched by the two guide rails in the vertical direction, so that the shade is held in tension. However, when the shade is wound up, the bars greatly increase the winding diameter and the bars cause a nonuniform winding process.

SUMMARY OF THE INVENTION

The primary object of the present invention is to devise a sunshade of the initially mentioned type which is improved as compared to the known constructions and which, in particular, does not require excess winding volume.

This object is achieved by a sunshade having a shade screen in which engagement elements are guided on the guide rails and are coupleable to the shade screen, the shade being pre-tensioned in the transverse direction when coupled to the engagement elements. Since the engagement elements are coupled to the shade screen only when the shade screen is being unrolled and pulled out from the winding shaft, and thus, when the shade screen is rolled up, there are no edge-side tensioning and holding elements, the thickness of the shade screen and thus also the winding diameter are uniform and also comparatively small over the entire width of the shade screen, so that the sunshade or winding shaft requires only a small installation space. The shade screen is formed of a length conventional shade material which is opaque or semi-transparent and contains for example a network structure. The sunshade, due to the transverse tension of the shade screen, is suitable not only for flat sunshades, but also for those curved in the lengthwise direction, which follow the curvature or arch of the motor vehicle roof.

Preferably, in the area of the front pull-out edge of the shade screen which is formed, for example, by a drawbar, the main engagement element engages on the respective side edge via which the shade screen is coupled to the engagement elements in the direction of motion of the shade. The engagement of the main engagement element is thus intended primarily for transfer of lengthwise forces, but in addition can also transfer transverse forces to produce the transverse tension.

Preferably, the engagement elements are located spaced apart on a carrier element that is strong in tension, especially a cable. The engagement elements which are formed, for example, as spheres, cubes, disks or plates, and especially have an outer side that is flat or planar as the engagement side. The engagement elements are, for example, formed from plastic or metal and, are pressed securely on the cable or a cord. In one preferred embodiment, the engagement elements form a endless drive chain which is guided over a drive wheel which is coupled to the winding shaft. However, there can also be engagement elements on fixed, movable carrier parts, such as rails, pieces of rail, or racks.

Because, according to one preferred embodiment, the engagement elements fit into recesses on the side edges and are held in the recesses with play in the direction of motion of the shade, the lengthwise tension in the shade screen can be set without bracing relative to individual engagement elements.

Advantageously, each guide rail for the engagement elements contains a channel which is formed in a guide slot for the side edge of the shade screen. In the channel, the engagement elements can be moved in the lengthwise directions together with the shade screen, while they are supported in the transverse direction, especially towards the center of the shade screen, and thus, can apply the tension force for the shade screen in the transverse direction. Furthermore, the guide rail can have a return channel for the engagement elements in which the endless drive chain is guided back again. However, the engagement elements can also return outside the guide rail.

When the drive wheel is coupled via a spring to the winding shaft and a closed flow of force is formed via the drive chain, the side edge of the shade screen, the winding shaft and the drive wheel, the shade screen can be pulled out into any position and can be located in it without an additional blocking means by the longitudinal tension of the spring. Furthermore, if the spring is a torsion-loaded helical spring which undergoes a change of tensioning when the shade screen is unwound as a result of the varying winding diameter relative to the constant diameter of the drive wheel, when the shade screen is pulled out the tension can be increased so that, for example, with the roof opened, fluttering of the pulled-out shade screen is counteracted.

The drawbar of the sunshade can be actuated manually or via a drive. Furthermore, a drive means can be provided with a drive motor, by which a respective drive cable is provided at each guide rail and is coupled or connected to the sunshade which can be unwound by the winding shaft which is pre-tensioned by spring force. In this case, the drive cable can be connected, for example, to the drawbar of the shade screen or to a drive chain which bears the engagement elements and which are coupled onto the shade screen.

Advantageously, the engagement elements, in an inlet section, are caused to engage the side edge of the shade screen which is not tensioned in the transverse direction and the shade screen is tensioned in or then on this inlet section in the transverse direction.

Instead of a endless drive chain, the drive chain which contains the engagement elements can have a free trailing end which is pushed into a return channel of the guide rail or into an outlet tube. The drive chain is formed to be relatively compressively stiff and/or guided against lateral deflection.

According to another preferred embodiment, it can be provided that the shade screen has teeth on its side edges, that a chain wheel which guides the drive chain is attached torsionally strong with the winding shaft to each of the two ends of the winding shaft and the chain wheel has teeth for respective engagement with the engagement elements of the drive chain, that the teeth of the chain wheel in joint rotation of the chain wheel with the winding shaft are positioned over the assigned teeth on the side edge of the wound shade screen and then pass through gaps between the teeth of the shade screen, the drive chain during unwinding of the shade screen from the winding shaft engaging the recesses on the teeth on the shade screen and continuing to be moved with of shade screen. The drive chain is thus placed in the plane of its lengthwise motion on the side edge of the shade screen, while the teeth of the chain wheel swivel away downward through the respective gaps on the edge of the shade screen. The transverse tension is then produced in the obliquely running guide section of the guide rail.

According to another preferred embodiment, the engagement elements are sections of a helical or screw-shaped drive part which fit into recesses on the side edge of the shade screen, are moved by rotation of the drive part around its lengthwise axis in the lengthwise direction, and in doing so, entrain the shade screen which is guided between two guide parts. The drive motion thus takes place in sliding engagement between the sections of the helical or screw-shaped drive part which continue to move apparently in the lengthwise direction, and the recesses of the shade screen. Since the drive part does not execute actual lengthwise motion, return for a endless drive chain or for the trailing end of the drive chain is not necessary, by which less space is required on the guide rail.

Basically, it can be provided that the guide rails are adjustable in the transverse direction or that they are supported spring-elastically. Thus, position tolerances which form during installation or in operation can be equalized later.

The motor vehicle roof can generally have a fixed transparent roof section or a roof opening with a movable, especially transparent cover, under which the sunshade is located.

The sunshade is explained in detail below using embodiments with reference to the drawings.

BRIEF DESCRIPTION OF THE DRAWINGS

FIG. 2 shows one side of the sunshade in an exploded perspective view;

FIG. 3 is a top view of a portion of one side edge of a shade screen engaged with the drive chain;

FIG. 13 is a sectional view of the attachment of the guide rail to the roof frame part;

FIG. 14 is a sectional view of another embodiment of the attachment of the guide rail to the roof frame part;

FIG. 15 is a plan view of the attachment of the guide rail to the roof frame part as shown in FIG. 14;

DETAILED DESCRIPTION OF THE INVENTION

Figure 1:
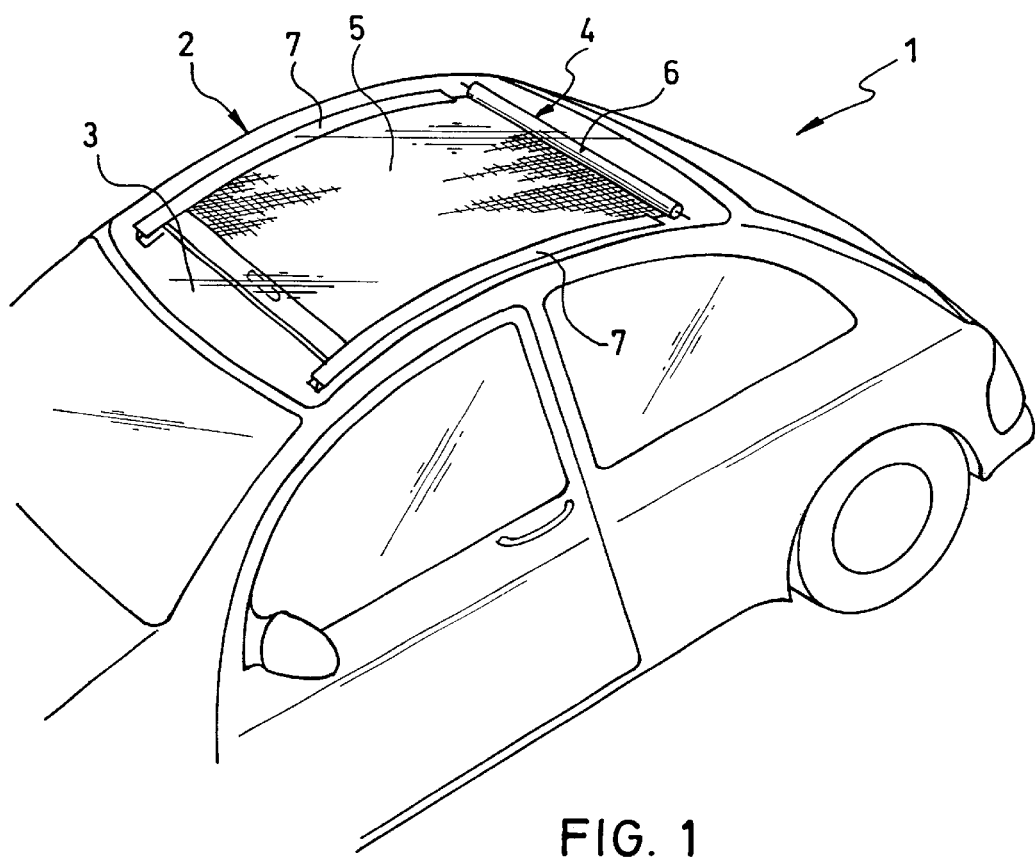
FIG. 1 is schematic top view of a motor vehicle roof with a fixed glass cover and a sunshade located under it.
Figure 9:
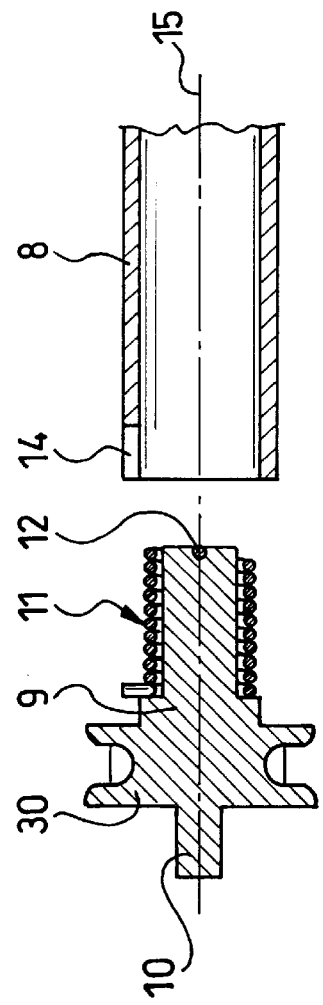
FIG. 9 is an exploded sectional view of a winding shaft and an end bearing part therefor.

A motor vehicle 1 has a motor vehicle roof 2 with a transparent roof section which, in the embodiment shown, is a fixed glass cover 3 (see FIG. 1). The transparent roof section can also be a movable cover for closing and at least partially clearing the roof opening of a motor vehicle roof which is to be opened, for example, a sliding roof, a sliding and lifting roof, a spoiler roof or the like. Underneath the motor vehicle roof 2 or the glass cover 3, there is a sunshade 4 which has a shade screen 5 and a winding shaft 6 for rolling and unrolling the shade screen 5, and two lateral guide rails 7 which run in the lengthwise direction of the vehicle, which are located opposite one another with respect to the glass cover 3 and follow the arch of the roof or of the glass cover 3 in the lengthwise direction. The winding shaft 6 has a hollow cylindrical winding body 8 (see FIG. 2 in which only the right side of the sunshade is shown), each end of which receives a respective bearing part 9 which is pivotally mounted on the motor vehicle roof via an axially projecting bearing journal 10. A helical leg spring 11 is attached coaxially to the bearing journal 10 (see also FIG. 9) and fixed with one leg 12 on it, while the other leg 13 is connected to the winding body 8 which extends over the leg spring 11, for example, by fitting into an axial groove 14 on the winding body 8 so that the leg 13 cannot rotate relative to the winding body 8. The winding body 8 can thus be rotated relative to the bearing journal 10 by an angle of rotation with respect to the axis 15 of rotation against the spring force of the leg spring 11.

Figure 4:
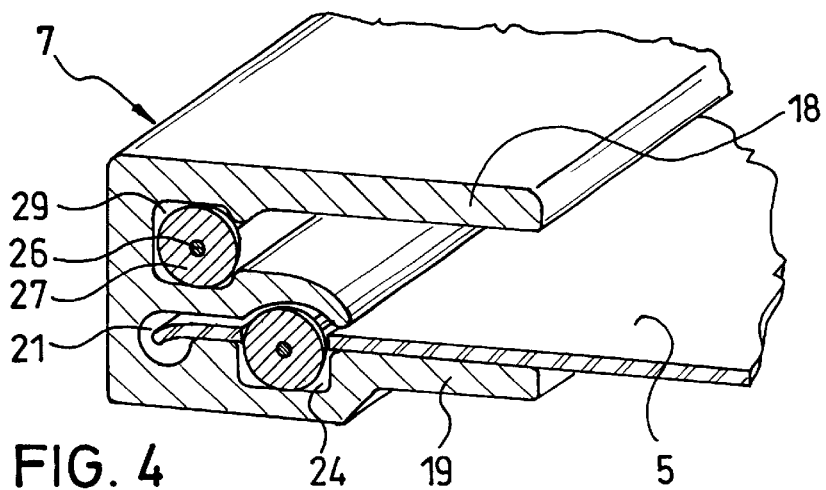
FIG. 4 is a perspective view of a section of a guide rail of the sunshade with a drive chain guided in it.

The shade screen, which can be unwound from the winding shaft 6, is guided on the respective lateral guide rail 7 via a front drawbar 16 with a sliding element 17 on each end of the drawbar 16 being movably held between the top leg 18 and the lower leg 19 of the respective guide rail 7. The shade screen 5 has side edges 20, each of which projects laterally beyond the drawbar 16 or the slide element 17 and is held and guided in a guide slot 21 of the guide rail 7 (see FIGS. 2 & 4). The guide slot 21 adjoins the inside 22 of the lower leg 19 which forms a slide surface for the slide element 17 and the side edge 20 of the shade screen in the plane of the shade screen to the outside. A plurality of rectangular perforations or recesses 23 which are spaced uniformly apart are formed along side edge 20 of the shade screen 5. The rectangular perforations or recesses 23 are located in a widened area, which is formed as the transport or guide channel 24, when the side edge 20 of the shade screen is held in the guide gap 21.

In the transport channel 24, a continuous, i.e., endless, drive chain 25 is guided and contains a cable 26 that is strong in tension and a plurality of engagement elements in the form of, for example, balls 27 which are attached to the cable 24 mutually spaced from each other at distance which corresponds to the spacing that separates the recesses 23 in the shade screen from one another. The drive chain 25 runs from a drive wheel 30 which is attached to the bearing part 10 so as to rotate with it, in a closed circuit, forward through the transport channel 24 of the guide rail 7, into a termination part or deflection part 28 which is attached to the front end of the guide rail 7 and in which it is redirected by in the opposite direction into an idle channel or return channel 29 of the guide rail 7 and finally back into the transport channel 24.

The first recess 23a which borders the drawbar 16 is matched to the shape of the balls 27 such that the ball 27 which is assigned to the first recess 23a is permanently located as the main engagement element in it in interlocking engagement without play both in the lengthwise direction and also in the transverse direction. The, for example, rectangular (see FIG. 2) or also round first recess 23a is surrounded by a reinforcement 31 on the shade screen 5 so that when the shade screen is being rolled or unrolled, force can be reliably transferred to the drive chain 25 via the ball 23a in the lengthwise direction.

Figure 5:
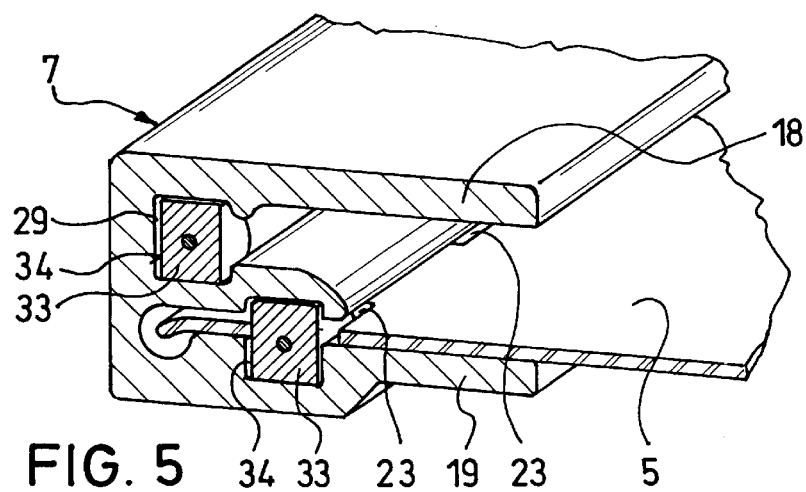
FIG. 5 is a view similar to that of FIG. 4, but showing another embodiment of the guide rail with a modified drive chain.

On the section of the side edge 20 which is held according to the respective pull-out position of the shade screen 5 in the guide rail 7 or in the guide slot 21, thus a ball 27 of the drive chain 25 engages in each recess 23 (see FIG. 3), each ball 27 adjoining the outside edge 32 of the recess 23 with a tensioning force which is directed outward (shown schematically by the arrow F) so that the shade screen is held tensioned in the transverse direction, while it can be moved in the lengthwise direction jointly with the drive chain 25. Within the rectangular recess 23, the ball 27 is held in the lengthwise direction roughly in the middle with bilateral play towards the front edge and rear edge of the recess 23. Instead of balls 27, engagement elements can also be, for example, elements flattened on the outer engagement side, for example, disks or plates 33 (see FIGS. 3 & 5) which enable more uniform transfer of force to the shade screen 5 in the transverse direction due to line contact of its flat side surface 34 (in contrast to point contact of balls) with the outside edge 32 of the recess 23.

Thus, there is a closed flow of force from the drive wheel 30, via which the balls 27 of the drive chain 25 run without slipping in the peripheral direction, via the drive chain 25 in the idle channel 29 and the first ball 27 in the first recess 23a to the shade screen 5 which in turn is rolled up on the winding body 8 which is coupled to the drive wheel 30. The tension of the shade screen in the lengthwise direction is achieved by the pre-tensioning of the winding body 8 as a result of the pre-tensioning of the leg spring 11 relative to the bearing part 9. The lengthwise tensioning of the shade screen can always be maintained uniformly over the entire pull-out length since only the first ball 27 is fixed in the first recess 23a in the lengthwise direction and the other balls 27 are held in their recesses 23 with play in the lengthwise direction. The transverse stress and lengthwise stress make it possible for the shade screen to follow the arch of the motor vehicle roof in the lengthwise direction without additional intermediate bars.

The lengthwise tensioning in the shade screen 5 can be set when the winding body 8 is mounted on the bearing part 9 by the winding body 8 being coupled to the leg spring 11 which is accordingly pre-tensioned rotationally, and for different coupling points, for example, on the end face of the winding body 8 several axial grooves 14 can be formed which are distributed around the periphery.

When the shade screen 5 is pulled out and unrolled from the winding shaft 6 or the winding body 8, either by manual actuation or a drive which acts, for example, on the drawbar, the winding diameter on the winding body 8 decreases, while the diameter of the drive wheel 30 which is relevant to the drive chain 25 is constant. The resulting path difference between the moving drive chain 25 and the shade screen in the lengthwise direction is equalized by relative twisting of the winding body 8 which bears the shade screen relative to the drive wheel 30 with increasing pre-tensioning by the leg spring 11.

Figure 10:
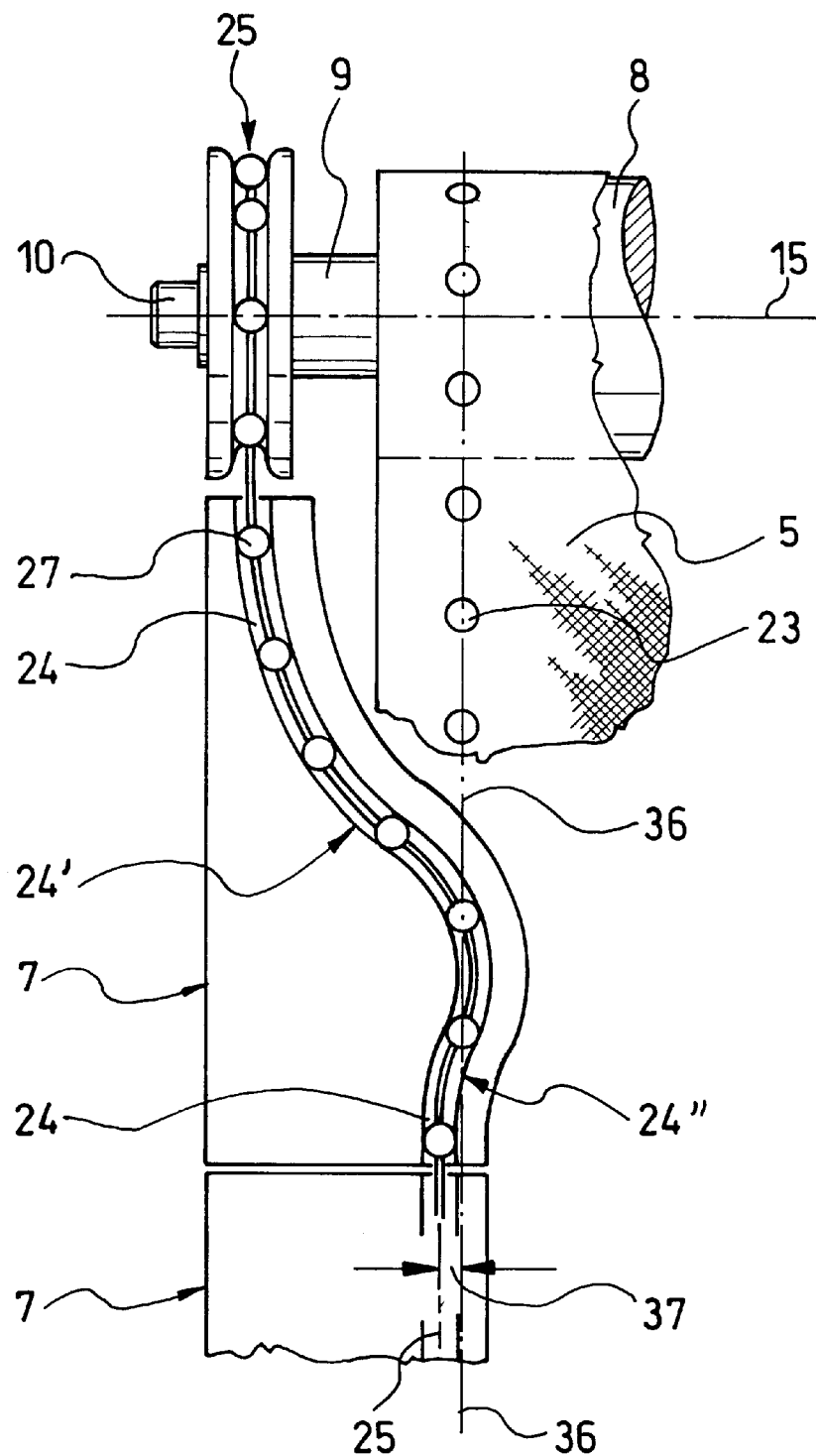
FIG. 10 is a plan view of a portion of the sunshade in the area of the winding shaft and feed of the drive chain to the shade screen.

The guide rail 7 has an inlet section 24' (see FIG. 10) in which the balls 27 of the drive chain 25 are guided at an acute angle to the plane 36 of motion of the recesses 23 which are moved in the lengthwise or pull-out direction with the unwinding shade screen which is not tensioned in the lengthwise direction and are inserted into the recess. After the balls 27 have been caused to fit into the recesses 23, they are guided outwardly in the transverse direction by a small path length 37 in the following short tensioning section 24" of the guide channel 24 so that they tension the shade screen in the transverse direction.

In the open position of the sunshade, the drawbar 16 remains on the back end of the guide rail 7, the shade screen with the reinforced first recess 23a also remaining in the guide rail 7 and the continuous engagement of the ball 27 or of the engagement element and thus the closed flow of force are preserved.

Figure 7:
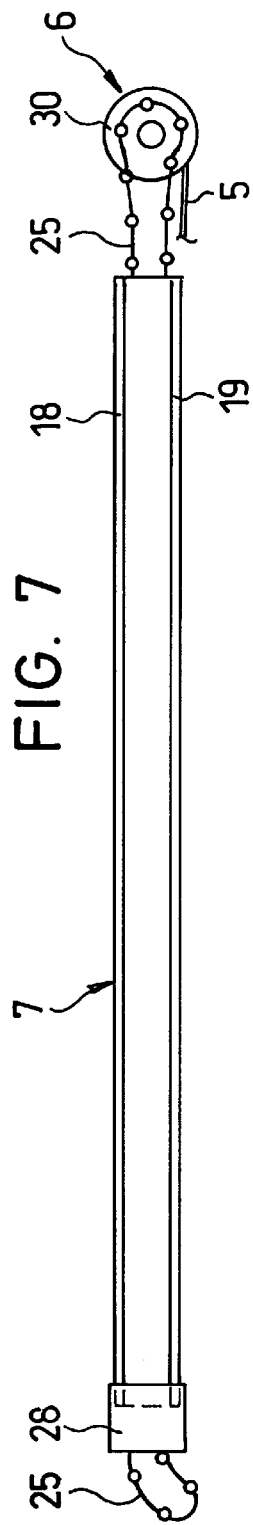
FIG. 7 is a schematic side view of the sunshade.
Figure 8:
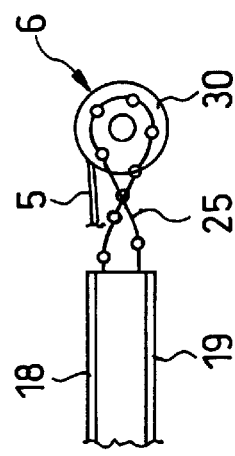
FIG. 8 is a partial schematic side view a modification of the FIG. 7 sunshade.

The drive chain 25 can be guided (see FIGS. 2 & 7) originating from the upper return channel 29 in one simple deflection via the drive wheel 30 and in the lower guide channel 24. The shade screen 5 slides, for example, on the inside 22 of the lower leg 19 of the guide rail 7. In an alternative embodiment, the drive chain 25 can run crossing between the guide rail 7 and the drive wheel 30 (see FIG. 8), and the shade screen 5 can be rolled up and unrolled in the opposite winding direction and is guided to slide on the inside of the upper leg 18 of the guide rail 7.

Figure 6:
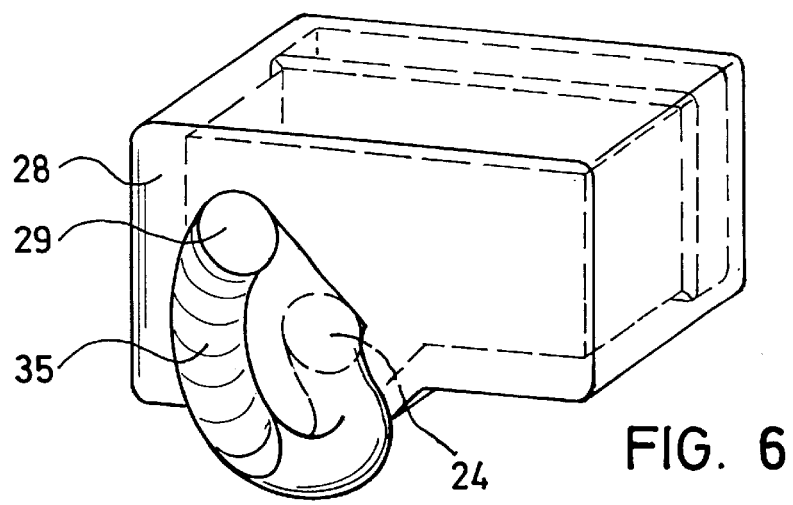
FIG. 6 is a perspective view of a section a front end piece of the guide rail.

The termination or deflection part 28 (see FIGS. 2 & 6) which is mounted on the front end of the guide rail 7 contains a guideway 35 which forms a deflection connection for the engagement elements or the balls 27 of the drive chain 25 between the return channel 29 and the guide channel 24. The guideway 35 can be formed within the deflection part 28 or also in front of it. Instead of the guideway, there can also be a deflection wheel or a comparable deflection means.

The sunshade 4 can also be used in the pulled-out position with the sliding roof opened while driving since as a result of the pre-tensioning in the transverse direction and the laterally fixed side edges of the shade screen fluttering of the shade screen 5 can be largely prevented.

Figure 11:
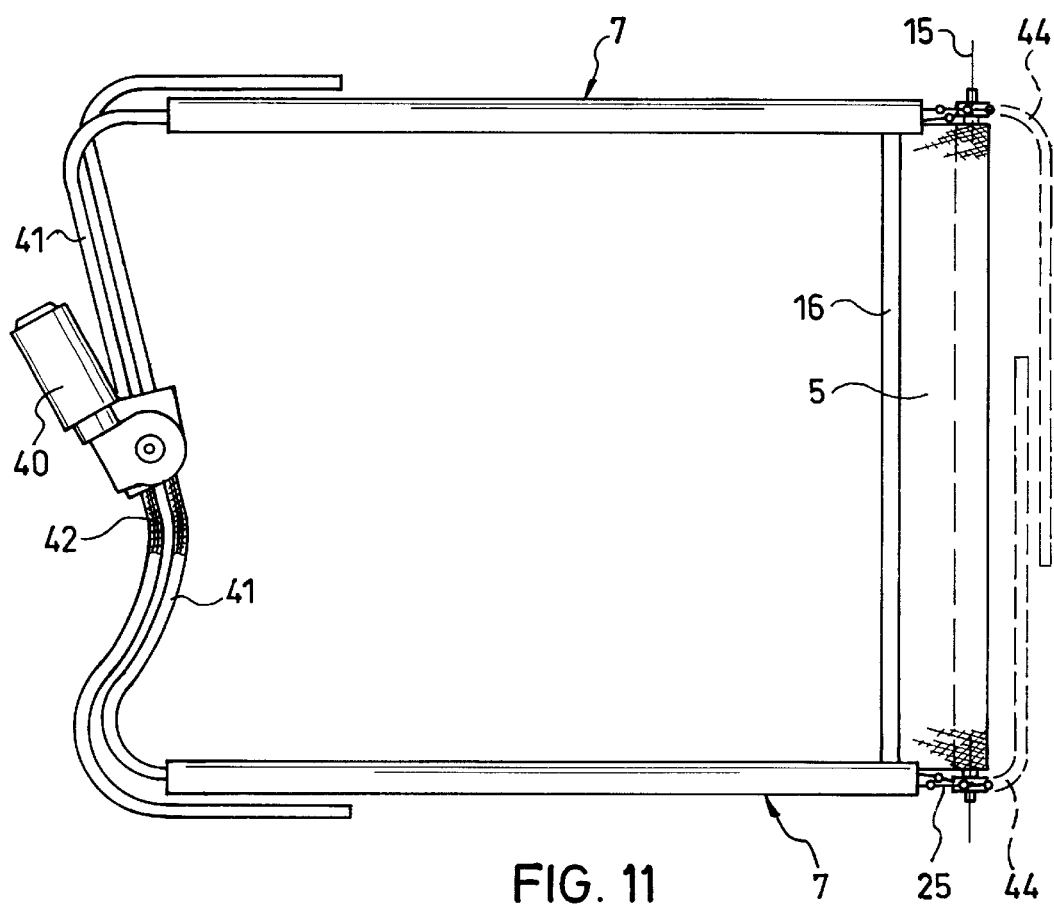
FIG. 11 is a plan view of another embodiment of a sunshade.
Figure 12:
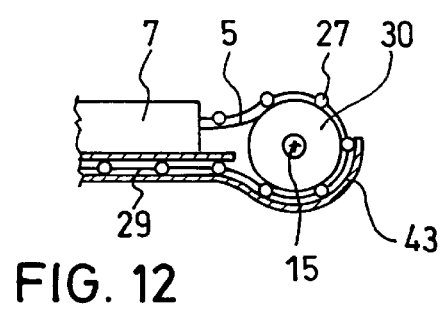
FIG. 12 is a side view of the area of the winding shaft of the embodiment of FIG. 11.

In one modified embodiment (see FIGS. 11 & 12), the sunshade 4 contains a drive means with a drive motor 40, by which each drive cable 42, guided in a respective tube 41, runs to each guide rail 7 and is guided through the guide channel 24 as far as the shade screen 5. The connection of the drive cable 42 to the shade screen takes place, for example, by attachment to the drawbar 16 or by a connection to the drive chain 25 which, in this example, begins with the first ball 27 in the first recess 23a (see FIG. 2) via which the drive wheel 30 is guided and extends into the return channel 29. The winding shaft 6 or the winding body 8 is pre-tensioned by means of a winding spring (not shown) which is supported on the vehicle counter to the pull-out direction (closed direction of the sunshade). When the sunshade 4 is closed, by actuating the drive motor 40, the shade screen 5 is unwound from the winding body 8, the pull-out force increasing by the tensioning winding spring.

When the shade screen is pulled out, in the already described manner, on each side of the shade screen 5, the engagement elements or balls 27 of the drive chain 25 are caused to fit into the recesses 23 on the side edge 20 of the shade screen 5 and by transverse motion pointed toward the outside, they apply transverse tension to the shade screen 5. The free end of the drive chain 25 is pulled out of the return channel 29 when the sunshade 4 is closed. When the partially or completely closed sunshade 4 is being opened, the shade screen 5 is retracted by the corresponding actuation of the drive motor 40 and by supporting the winding springs and is rewound again. In doing so, the drive chain 25 is decoupled from the shade screen and retracted via the drive wheel 30 into the return channel 29. The drive chain 25, for this purpose, is formed with a relatively compressively stiff cable 26, or instead of the cable 26, with partially flexible connection elements between the balls 27. In addition, there can be a guide rail 43 (FIG. 12) which surrounds the drive wheel 30 and prevents lateral deflection of the pushed drive chain 25 by the drive wheel 30.

Alternatively, the free end of each drive chain 25 can be held in an additional outlet tube 44 (shown in FIG. 11 with interrupted lines), and when the sunshade 4 is closed, it can be pulled out of the tube 44 and when the sunshade 4 is opened can be pushed back into it.

FIG. 13 shows the attachment of the guide rail 7 by means of a screw 45 which passes through the oblong hole 46 which is formed in the transverse direction of the guide rail 7 on the roof frame part 47. In this way, the guide rail 7 can be adjusted on the roof frame part 47 during installation or subsequently to the required distance to produce the desired transverse tensioning of the shade screen 5. The guide rail 7 is attached to the roof frame part 47 with several screws 45 along their length. The adjustment play can also be produced by a round hole with a diameter which is much larger than the screw shaft instead of by means of an oblong hole 46.

In the mounting shown in FIGS. 14 & 15, the guide rail 7 contains two lateral lengthwise grooves 48, 49 on its top which open in opposite directions and fit movably in the holding legs 50, 51 of a roof frame part 52 which are pointed opposite one another so that the holding legs 50, 51 hold the guide rail 7 in the vertical direction without play. A leaf spring 53 which is bent in a corrugated shape is inserted between the stop 54 on the guide rail 7 and the stop 55 on the roof frame part 52 and pretensions the guide rail 7 outwardly in the transverse direction. In this way, with the spring force set accordingly, transverse pre-tensioning of the shade screen 5 can also be maintained even at installation tolerances.

Figure 16:
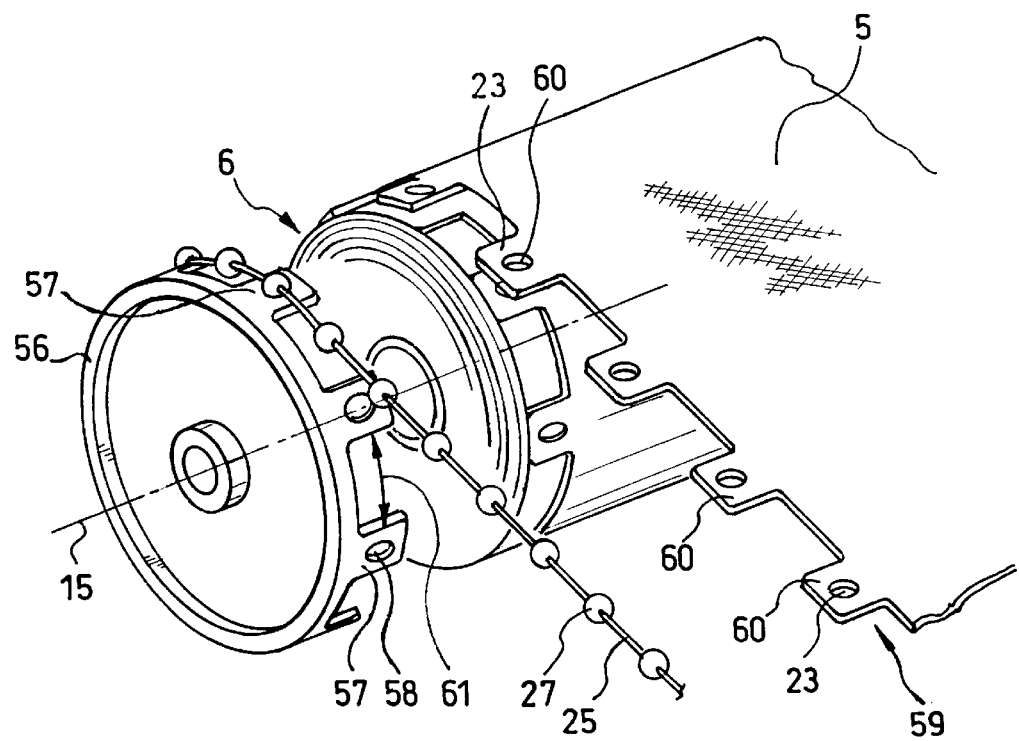
FIG. 16 is a perspective exploded view of another embodiment of a sunshade with a chain wheel attached to the end of the winding shaft.

Another modified embodiment of the sunshade 4 contains a winding shaft 6' (see FIG. 16), on the respective end of which a chain wheel 56 is attached to rotate with the winding shaft 6'. The chain wheel 56 has, on its periphery in the direction of the axis 15, rotation teeth 57 which project laterally toward the shade screen 5' and which each contain an opening 58 for holding a ball 27 of the drive chain 25. The teeth 57 of the chain wheel 56, which is attached to the winding shaft 6' (FIG. 16 shows the chain wheel 56 before attachment to the end face of the winding shaft 6', spaced away from the latter) extend beyond the edge 59 of the shade screen 5', which has teeth 60 which project laterally in the direction of the axis 15 of rotation, the teeth 60 each having a recess 23 for the balls 27. The recesses 58 on the teeth 57 of the chain wheel 56 and the recesses 23 on the teeth 60 on the edge 59 of the shade screen are located in the same plane perpendicular to the axis 15 of rotation of the winding shaft 6'.

The width of each tooth 60 on the edge 58 of the shade screen is smaller than the gaps 61 between the teeth 57 of the chain wheel 56 so that when the shade screen 5' is unrolled from the winding shaft 6', a tooth 60 of the shade screen 5' can always pass through the gap 61 on the chain wheel 56.

Since the winding diameter on the winding shaft 6' changes when rolling and unrolling the shade screen 5', the distance of two adjacent teeth 60 along the length of the shade screen 5 is matched to this change so that unhindered passage of the teeth 60 of the shade screen through the gaps 61 between the teeth 57 of the chain wheel 56 is always ensured. The drive chain 25 can be caused to engage the recesses 23 on the unrolling shade screen 5' in this way without acutely-angled feed.

Figure 17:
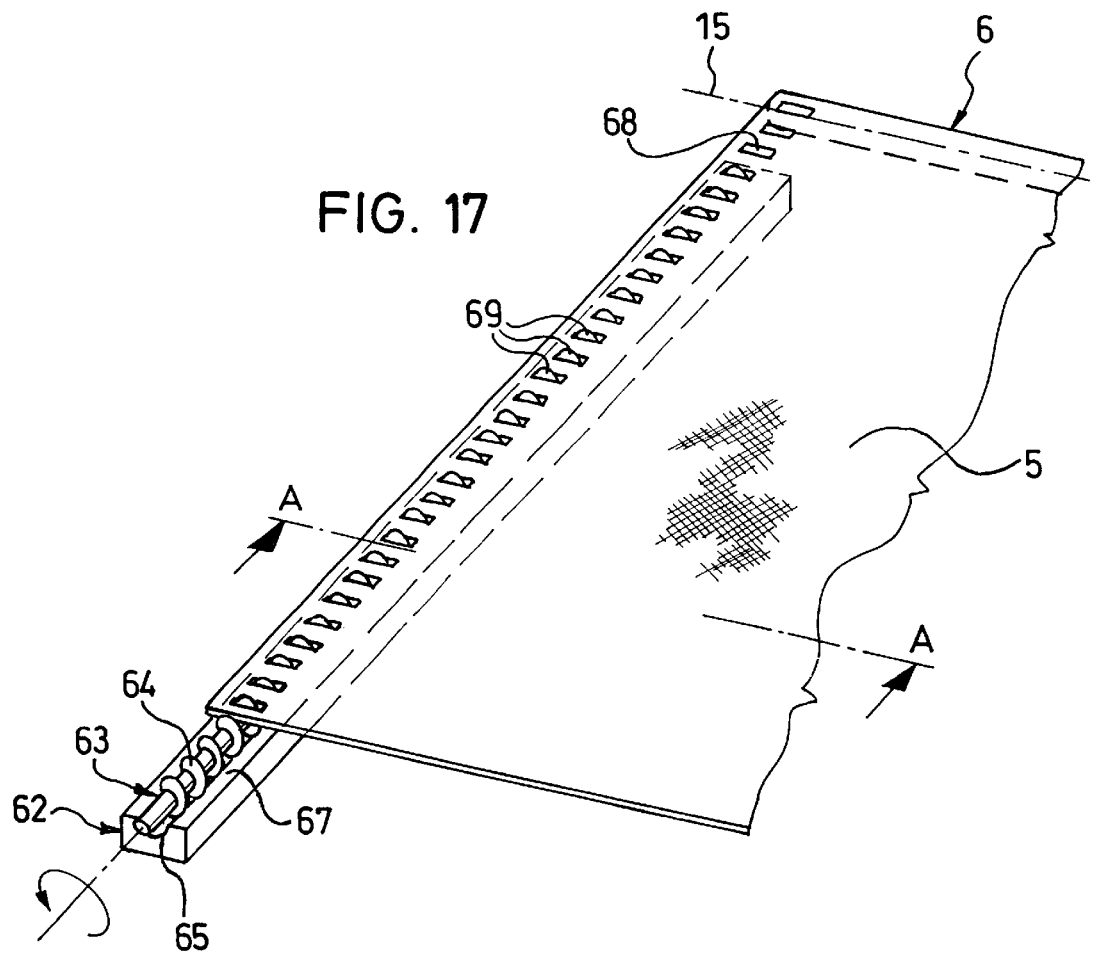
FIG. 17 is a perspective view yet another embodiment of a sunshade with a screw drive for moving the length of shade.
Figure 18:
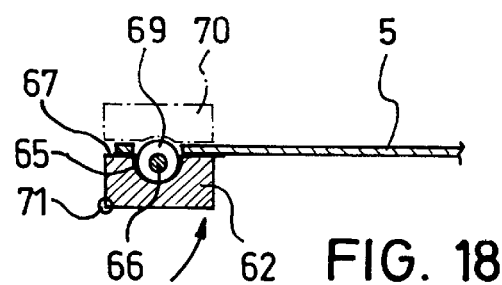
FIG. 18 is a sectional view taken along line A—A in FIG. 17 showing a guide for the screw drive.

Another embodiment of the sunshade (see FIGS. 17 & 18) contains a screw drive for moving the shade screen along a guide rail 62. The screw drive has a drive cable 63 as is used in the drive shown in FIG. 11 or in a sliding roof drive. The drive cable 63 which contains a continuous screw coil 64 is held in an trough-shaped or roughly semi-cylindrical lengthwise recess 65 in the guide rail 62 such that its core 66 is located underneath the top 67 of the guide rail 62 and only the screw coil 64 projects upward. The shade screen 5, which can be wound and unwound on the winding shaft 6, contains on its side edge a perforation with a plurality of recesses 68 which have a size and shape such that when the shade screen rests on the guide rail 62, the recesses hold the individual sections 69 of the screw coil 64 which project upward.

A second guide rail 70 (see FIG. 18, not shown in FIG. 17) is located above the first lower guide rail 62 with a defined distance in which the shade screen is movably held in the lengthwise direction. The drive cable 63 is turned around its lengthwise axis so that the screw coil 64 "migrates" in the lengthwise direction for displacing the shade screen 5 along the guide rails 62, 70 by the coil sections 69 fitting into the recesses 68 of the shade screen 5. In the transverse direction, the shade screen is held tensioned between the screw coils 64 of the two opposing drive cables 63.

For installation, the lower guide rail 62 can be supported to be able to pivot around a lengthwise pivot axis 71 so that with the drive cable 63 and a least the initial section of the shade screen 5 interposed with between the guide rails, the lower guide rail can be pivoted up toward the upper guide rail 70. On the other hand, the drive cable 63 can be pushed together with the shade screen 5 into the lengthwise guides during installation.

Instead of the drive cable 63, a worm drive or screw drive can also be used. The side edge of the shade screen can be reinforced in the area of the recesses 68 to prevent damage to the shade screen 5. The force is transferred uniformly to the shade screen 5 in the lengthwise direction on all recesses 68 on which the screw coil turns 64 or their sections 69 engage. The shade screen 5 can also be kept tensioned in the lengthwise direction.

What is claimed is:

1. Sunshade for a motor vehicle roof, comprising a shade screen which is windable onto a winding rod mountable underneath the roof, guide rails for movably guiding opposing side edges of the shade screen in a direction of shade movement, and engagement elements guided on the guide rails, said engagement elements being coupleable and disengageable with respect to the shade screen, further including pre-tensioning means for applying a tensioning force to said side edges of the shade screen in opposite directions, transversely outward relative to said direction of shade motion when coupled to the engagement elements.

2. Sunshade as claimed in claim 1, wherein a main engagement element of said engagement elements engages an area of a front pull-out edge of the shade screen at a respective side edge of the shade screen to guide the shade screen in the direction of shade movement.

3. Sunshade as claimed in claim 1, wherein the engagement elements are located spaced apart on a carrier element that is tension resistant.

4. Sunshade as claimed in claim 3, wherein said carrier element is a cable.

5. Sunshade as claimed in claim 2, wherein the engagement elements fit into recesses on the respective side edge with play in the direction of motion of shade movement.

6. Sunshade as claimed in of claim 5, wherein the engagement elements are spherical.

7. Sunshade as claimed in claim 5, wherein the engagement elements have a flat engagement side.

8. Sunshade as claimed in claim 1, wherein the engagement elements are provided on an endless drive chain which is guided over a drive wheel which is coupled to the winding shaft.

9. Sunshade as claimed in claim 1, wherein each guide rail for the engagement elements has a channel which is formed in a guide slot for a respective side edge of the shade screen.

10. Sunshade as claimed in claim 9, wherein each guide rail has a return channel for the engagement elements.

11. Sunshade as claimed in claim 8, wherein the drive wheel is coupled via a spring to the winding shaft, and wherein a force is transmitted via the drive chain, the side edge of the shade screen, the winding shaft and the drive wheel.

12. Sunshade as claimed in claim 11, wherein the spring is a torsion-loaded helical spring which undergoes a change of pre-tensioning when the shade screen is unwound as a result of a varying winding diameter of the shade screen relative to a constant diameter of the drive wheel.

13. Sunshade as claimed in claim 1, wherein a drawbar is attached to a lead edge of the shade screen.

14. Sunshade as claimed in claim 13, wherein said drawbar is manually actuatable.

15. Sunshade as claimed in claim 8, wherein the drive chain runs crossing itself between the respective guide rail and the drive wheel.

16. Sunshade as claimed in claim 1, wherein each guide rail has an inlet section in which the engagement elements are caused to engage the side edge of the shade screen and tension the shade screen in the transverse direction.

17. Sunshade as claimed in claim 1, wherein the engagement elements are provided on a drive chain which is guided over a drive wheel which is coupled to the winding shaft; further comprising a pre-tensioned spring acting on said winding shaft, and a drive motor for driving a respective drive chain through each guide rail and coupling the drive chain to the shade screen for unwinding the shade screen from the winding shaft against the force of said spring.

18. Sunshade as claimed in claim 17, wherein each guide rail has a return channel, and wherein the drive chain has a free trailing end which is pushed into the return channel of the guide rail.

19. Sunshade as claimed in claim 17, wherein each guide rail has an outlet tube, and wherein the drive chain has a free trailing end which is pushed into the outlet tube.

20. Sunshade as claimed in claim 1, wherein the engagement elements are provided on a drive chain which is guided over a drive wheel which is coupled to the winding shaft; wherein the shade screen has teeth on side edges thereof, wherein a chain wheel for guiding the drive chain is attached on each end of the winding shaft so as to rotate therewith, wherein the chain wheel has teeth for engagement with the engagement elements of the drive chain, wherein the teeth of the chain wheel, in joint rotation of the chain wheel with the winding shaft, are positioned above the teeth on the side edges of the shade screen wound on the winding shaft at a spacing that enables the teeth of the shade screen to pass between the teeth of the chain wheel as the shade screen is unwound from the winding shaft, the engagement elements on the drive chain engaging in recesses in the teeth of the shade screen during unwinding thereof from the winding shaft and continuing to move with the shade screen.

21. Sunshade as claimed in claim 1, wherein the engagement elements are sections of a screw-shaped drive part which fit into recesses on the side edge of the shade screen and are moved by rotation of the drive part around a lengthwise axis thereof, said sections of a screw-shaped drive part entraining the shade screen which is guided between two guide parts.

22. Sunshade as claimed in claim 1, further including means for adjusting the guide rails in the transverse direction.

23. Sunshade as claimed in claim 1, wherein the guide rails are supported spring-elastically in the transverse direction.

24. Sunshade as claimed in claim 1, wherein the guide rails are curved in the direction of motion of the shade for matching a motor vehicle roof curvature.

25. A motor vehicle roof, comprising a transparent roof section and a sunshade mounted under said roof for selectively screening said transparent roof section, said sunshade comprising a shade screen which is windable onto a winding rod which is mounted underneath the roof, guide rails for movably guiding opposing side edges of the shade screen in a direction of shade movement, and engagement elements guided on the guide rails, said engagement elements being coupleable and disengageable with respect to the shade screen, further including pre-tensioning means for applying a tensioning force to said side edges of the shade screen in opposite directions, transversely outward relative to said direction of shade motion when coupled to the engagement elements.

* * * * *